(12) United States Patent
Mariansky

(10) Patent No.: US 11,619,045 B1
(45) Date of Patent: Apr. 4, 2023

(54) BUILDING MATERIAL DEVICE METHOD

(71) Applicant: Reynaldo Mariansky, Sacramento, CA (US)

(72) Inventor: Reynaldo Mariansky, Sacramento, CA (US)

( * ) Notice: Subject to any disclaimer, the term of this patent is extended or adjusted under 35 U.S.C. 154(b) by 0 days.

(21) Appl. No.: 17/885,343

(22) Filed: Aug. 10, 2022

(51) Int. Cl.
| | | |
|---|---|---|
| *E04C 2/34* | (2006.01) | |
| *E04C 2/26* | (2006.01) | |
| *B32B 15/02* | (2006.01) | |
| *B32B 13/06* | (2006.01) | |
| *B32B 25/04* | (2006.01) | |
| *B32B 38/00* | (2006.01) | |
| *B32B 37/15* | (2006.01) | |

(52) U.S. Cl.
CPC ............... *E04C 2/34* (2013.01); *B32B 13/06* (2013.01); *B32B 15/02* (2013.01); *B32B 25/04* (2013.01); *B32B 37/15* (2013.01); *B32B 38/0004* (2013.01); *E04C 2/26* (2013.01); *B32B 2272/00* (2013.01); *B32B 2305/10* (2013.01); *B32B 2311/00* (2013.01); *B32B 2315/06* (2013.01); *B32B 2319/00* (2013.01); *B32B 2419/06* (2013.01)

(58) Field of Classification Search
CPC .. E04C 2/34; E04C 2/26; Y02W 30/62; Y10S 83/951; Y10S 52/09; B29K 2105/26; B32B 13/06; B32B 15/02; B32B 25/04; B32B 37/15; B32B 38/0004; B32B 2272/00; B32B 2305/10; B32B 2311/00; B32B 2315/06; B32B 2319/00; B32B 2419/06; Y10T 29/49716; Y10T 29/49751
See application file for complete search history.

(56) References Cited

U.S. PATENT DOCUMENTS

| | | | | |
|---|---|---|---|---|
| 3,728,749 A | * | 4/1973 | Eby | B63B 35/58 114/267 |
| 5,013,509 A | * | 5/1991 | Kiselewski | E02B 3/04 264/912 |
| 5,214,897 A | * | 6/1993 | Nordberg | E04C 1/40 52/606 |
| 5,285,616 A | * | 2/1994 | Tripp | E04C 3/36 52/DIG. 9 |
| 5,316,815 A | * | 5/1994 | Tripp | E02D 3/08 52/DIG. 9 |
| 5,507,127 A | * | 4/1996 | Gates | E04C 1/40 52/DIG. 9 |
| 5,682,677 A | * | 11/1997 | Mahoney | B23K 20/129 29/894.35 |
| 5,746,037 A | * | 5/1998 | Nordberg | E04C 1/40 242/525.3 |
| 2009/0001131 A1 | * | 1/2009 | Sunahara | B60B 25/02 228/2.1 |

* cited by examiner

*Primary Examiner* — David P Bryant
*Assistant Examiner* — Christine Bersabal
(74) *Attorney, Agent, or Firm* — Theodore J. Bielen, Jr.

(57) ABSTRACT

A method of forming a building material device utilizing a vehicle tire where the vehicle tire is split into three portions. Two of the vehicle portions are recombined into a subunit which is capable of holding the third portion within a chamber. The subunit containing the second portion is then combined with panels to form a finished unit capable of being used in a building structure.

7 Claims, 4 Drawing Sheets

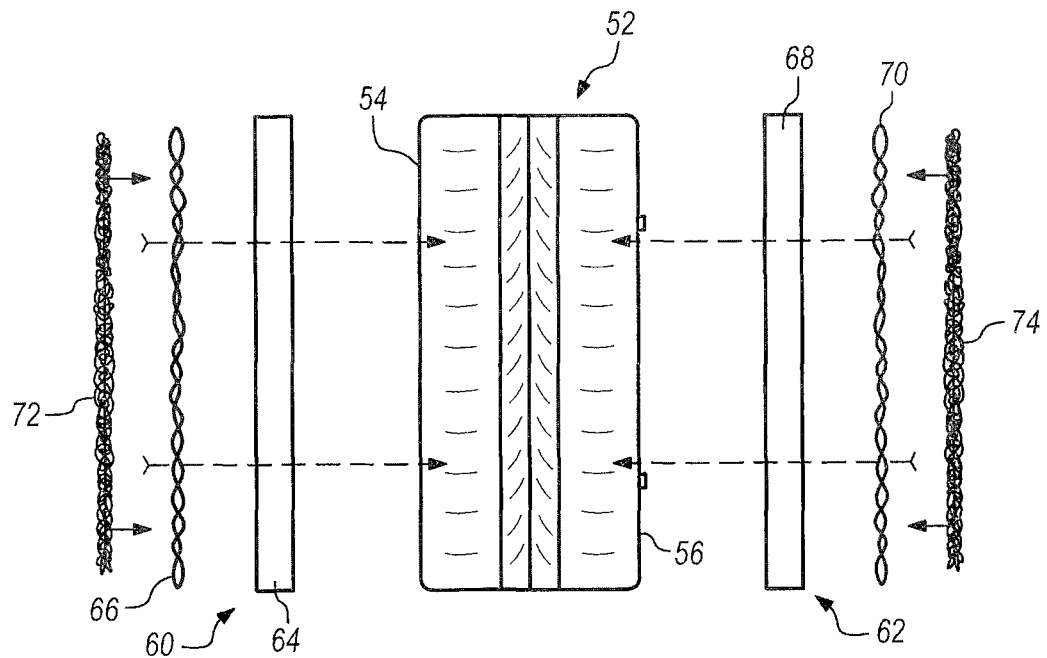
FIG. 5
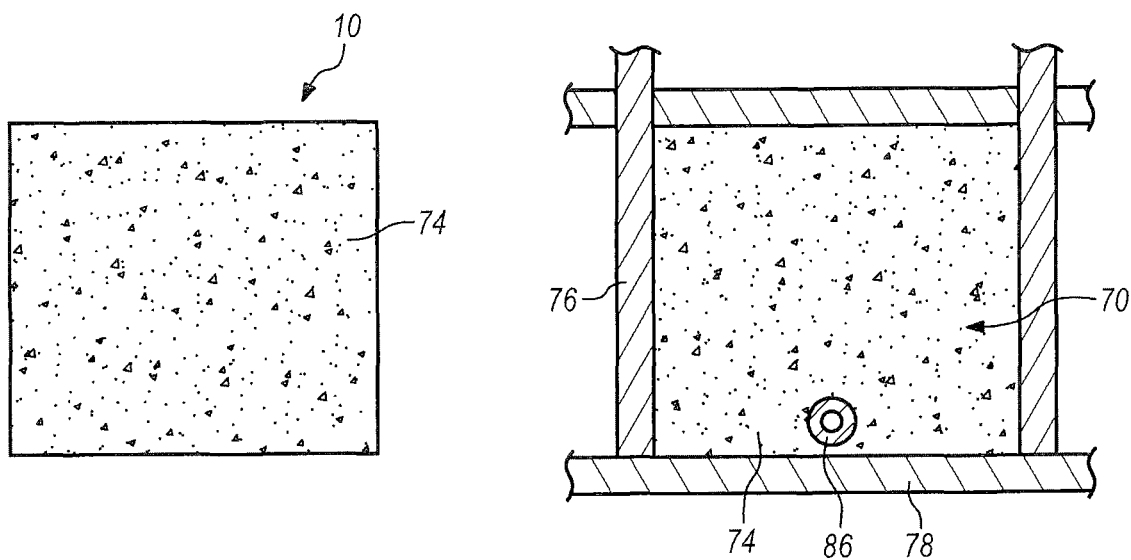
FIG. 6
FIG. 7

BUILDING MATERIAL DEVICE METHOD

BACKGROUND OF THE INVENTION

The present application relates to a novel and useful method of constructing a building material device utilizing a vehicle tire.

Worn-out vehicle tires, rubbish tires, are often discarded rather than being retreaded. Such discarding entails burying worn tires in landfills which creates "tire graveyards". Such "tire graveyards" are considered to be a common environmental hazard by creating significant pollutants and other challenges. For example, tire graveyards have been subject to highly toxic fires.

Needless to say, disposing of tires that are no longer suitable for use in vehicles, due to wear or irreparable damage, presents a vexing problem. The durability of tires compounds such problem when tires become a source of waste. Rubbish tires, being highly durable and non-biodegradable, also consume valuable space in landfills with the possibility of the creation of rubber pollution.

Discarded tires may be used as fuel, but also tires may be converted into ground or crumb rubber, which may be employed as paving material. Although such use is desirable, a relatively small percentage of used tires are formed into ground rubber.

A novel use for rubbish tires would be a notable advance in the art of recycling of materials.

In accordance with the present application, a novel and useful method of constructing a building material device utilizing a vehicle tire is herein provided.

The method for such use entails the splitting of a rubbish tire into three portions. The first and third portions may be then reunited into a subunit. The second portion may be then either discarded or used to fill chambers of the subunit formed by the first and third fastened portions.

After formation of the subunit by the fastened first and third portions of the tire, plates may be attached to the first and second sides of the subunit.

Such plates may comprise a screen or a solid body combined with a screen. Following such attachments, cementitious material is applied to the first and second sides of the subunit to create a finished unit. Once the cementitious material has achieved a hardened state, a building material device has been formed.

The building material device may then be employed in combination with studs and cross members to create a wall or a roof on a structure. Conduits may be inserted within the building material device in order to carry electrical cables, water, gas, waste drainage, and the like. In addition, reinforcement bars may be added to increase the durability of the structure, especially when forming the roof of the same.

It may be apparent that a novel and useful method of constructing a building material device has been hereinabove described.

It is therefore an object of the present application to provide a method of constructing a building material device which utilizes worn or damaged vehicle tires.

Another object of the present application is to provide a method of constructing a building material device utilizing worn or damaged vehicle tires by the formation of the same into units, which are compatible with studs and cross members of a structure.

Another object of the present application is to provide a method of constructing a building material device that avoids usual disposal methods for such tires in the form of landfill use and burning of the same.

Another object of the present application is to provide a method of constructing a building material device utilizing worn or damaged tires but avoids the prior disposal methods that create air pollution as a result of burning and the generation of methane gasses as a result of use in landfills.

Another object of the present application is to provide a method of constructing a building material device which avoids the risk of fires occurring when worn tires are stockpiled.

Another object of the present application is to provide a method of constructing a building material device which avoids the illegal dumping of scrap tires, which tend to pollute ravines, woods, deserts, empty lots, and the like.

The application possesses other objects and advantages which may be apparent as the specification continues.

BRIEF DESCRIPTION OF THE SEVERAL VIEWS OF THE DRAWINGS

FIG. 5 is an exploded side view of the subunit depicted in FIG. 4 for combination with panel elements and cementitious material.

FIG. 6 is a front-elevational view of the finished unit comprising the building material device formed with the components shown in FIG. 5.

FIG. 7 is a front-elevational view of the building material device used with studs and cross members in a structure.

For a better understanding of the application, reference is made to the following detailed description of the preferred embodiments thereof which should be referenced to the prior described drawings.

DETAILED DESCRIPTION OF THE PREFERRED EMBODIMENTS

Various aspects of the present application will evolve from the following detailed description of the preferred embodiments thereof which should be referenced to the prior delineated drawings.

Figure 1:
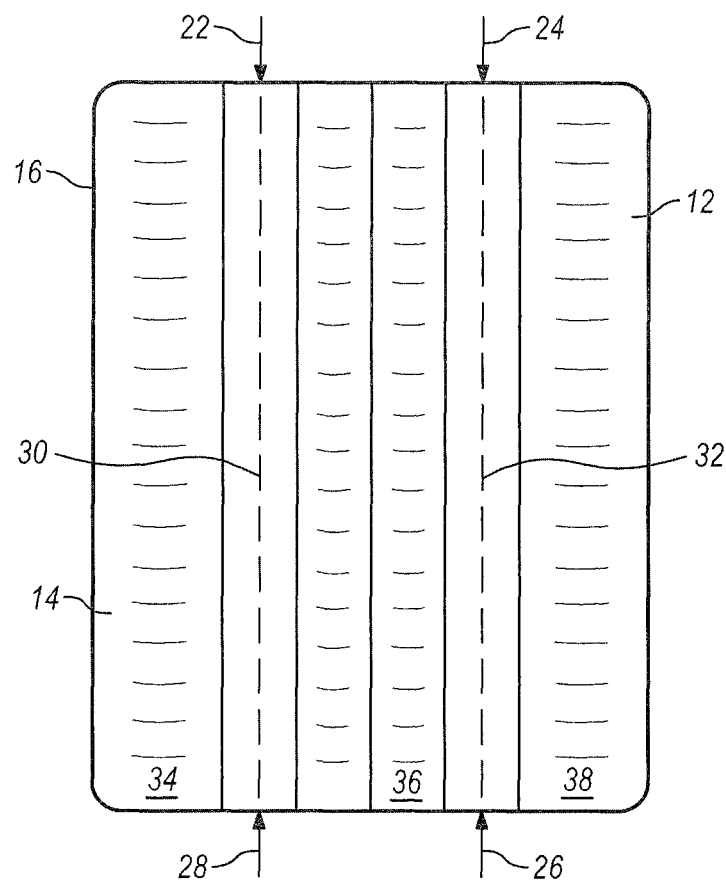
FIG. 1 is a front-elevational view of a whole rubbish tire.
Figure 2:
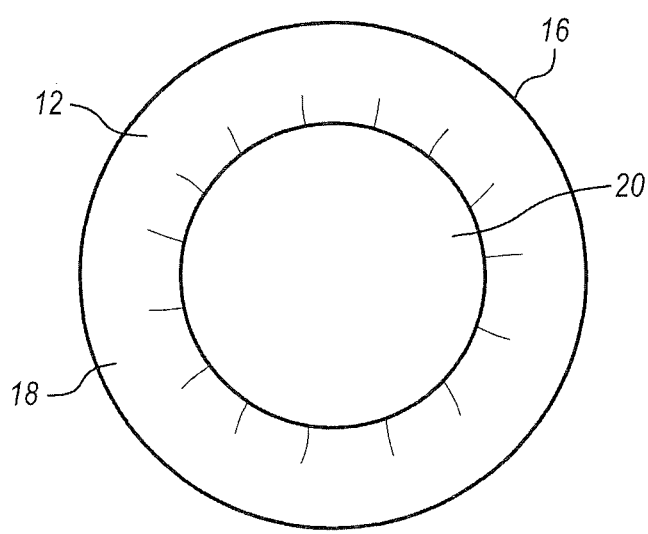
FIG. 2 is a side-elevational view of a whole rubbish tire.

The device formed by the method sought for patenting is depicted in the drawings by reference character 10. The method is best illustrated in FIGS. 1-5. With reference to FIG. 1, it may be observed that a worn or damaged vehicle tire, rubbish tire, 12 is shown and is made from rubber or rubber-like material. Rubbish tire 12 includes a tread surface 14 and a perimeter 16. Rubbish tire 12 is also formed with a side portion 18 and a circular chamber 20, FIG. 2. Directional arrows 22, 24, 26, and 28, FIG. 1, indicate the intended cutting or slicing of rubbish tire 12 as a part of the method of the present application. Dashed lines 30 and 32 identify the intended path of the cut of rubbish tire 12.

Figure 3:
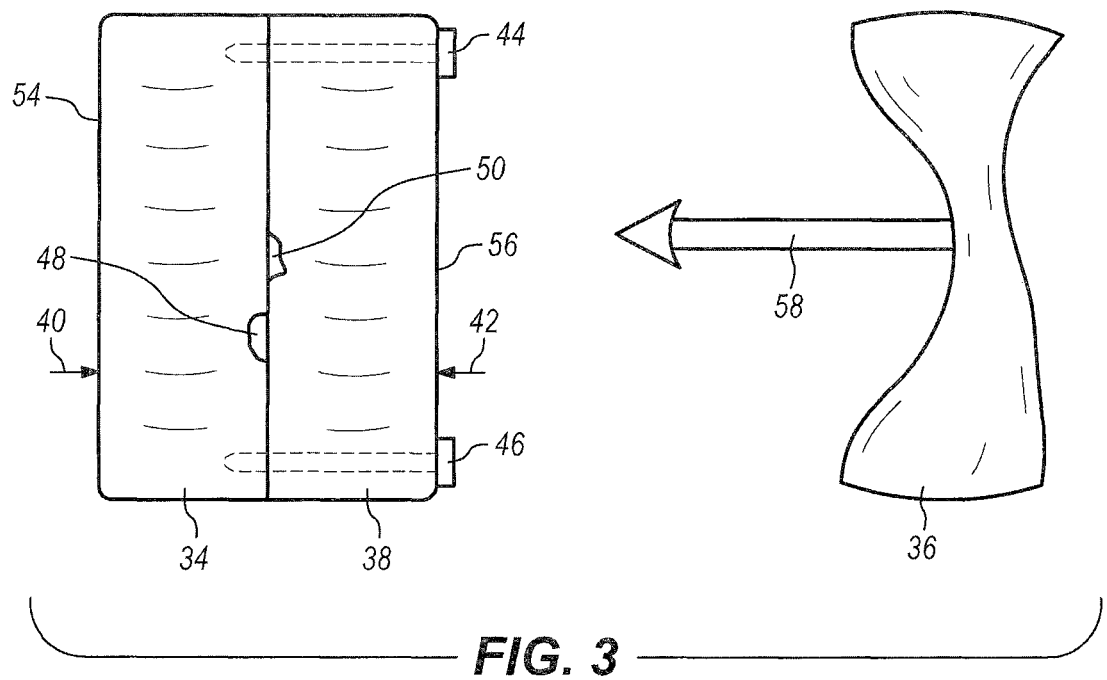
FIG. 3 is a front-elevational view of the rubbish tire of FIG. 1 formed into three portions.
Figure 4:
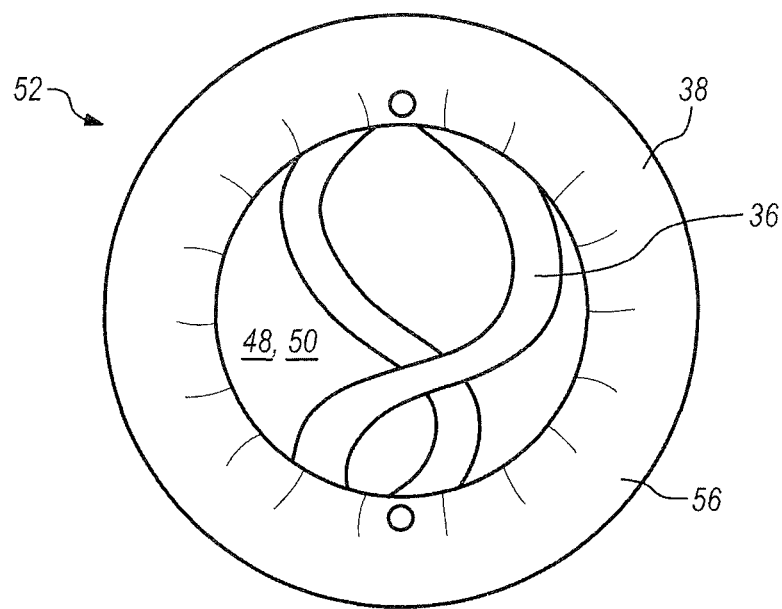
FIG. 4 is a side-elevational view of the subunit formed by three portions depicted in FIG. 3.

Turning to FIG. 3, the method of the present application is further shown in which rubbish tire 12 has been sliced into three portions. First portion 34, second portion 36, and third portion 38 are thus illustrated. First, second, and third portions 34, 36, and 38 are also labeled on FIG. 1 for the sake of clarity. In other words, rubbish tire 12, having been split, forms first portion 34, second portion 36, and third portion 38. First portion 34 and third portion 38 are then combined according to directional arrows 40 and 42 and held to each other by fasteners 44 and 46. Of course, other connectors may be used, such as glue, welds, and the like. First portion 34 of rubbish tire 12 and third portion 38 of rubbish tire 12 include first chamber 48 and second chamber 50, each possessing a circular perimeter, the shapes of which are shown in FIG. 4. Second portion 36 of rubbish tire 12 is stuffed or placed within first and second chambers 48 and 50, as shown in FIG. 4. Thus, a compact subunit composed of first, second, and third portions 34, 36, and 38 is formed. Subunit 52 includes a first side 54 and a second side 56. Directional arrow 58 shows the movement of second portion 36 within chambers 48 and 50 of subunit 52, FIG. 3. It should be noted that other waste material may be placed within first and second chambers 48 and 50 of subunit 52. Needless to say, second portion 36 of rubbish tire 12 may be manually compressed to be firmly positioned within chambers 48 and 50 of subunit 52.

Turning to FIG. 5, the method of the present application is further illustrated in which rectangular plates 60 and 62 are applied to sides 54 and 56 of subunit 52, respectively. Plate 60 may be formed with a solid panel 64 and a screen 66 or by a simple screen 66. Likewise, plate 62 may be formed with a solid panel 68 and a screen 70 or simply by screen 70. In any case, the contents of chambers 48 and 50 are confined therewithin. Once plates 60 and 62 are attached to sides 54 and 56 of subunit 52, cementitious material masses 72 and 74 are applied to panels 60 and 62 and held by screens 66 and 70. The outer surfaces of cementitious material masses 72 and 74 are then smoothed to form a rectangular finished unit or building material device 10, shown in FIGS. 6-8.

Figure 8:
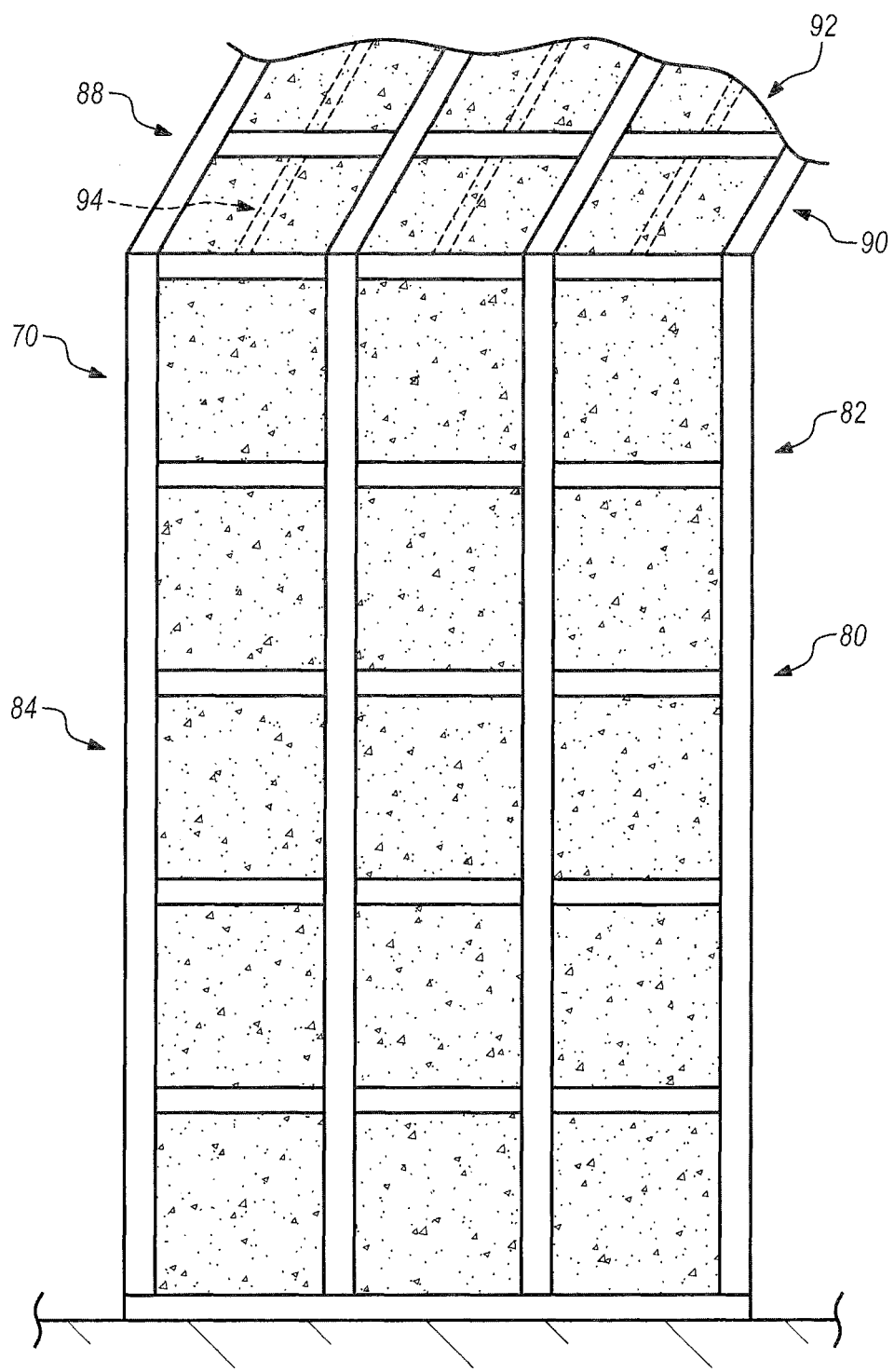
FIG. 8 is a partial isometric view of a wall and roof formed using the building device of the present application.

Device 10 may be employed in a building structure by the use of conventional building components. For example, wall 80 may be fashioned using plurality of studs and cross members 82 and a multiplicity of devices 84 identical or similar to device 10. It should be noted that device 10 may include the use of a conduit 86 or plurality of such conduits to allow for the carrying of electrical cables, electronic conduits, and the passage of water, gas, and drainage materials as required by the building employing device 10 as a construction device, FIG. 7. In addition, FIG. 8 illustrates the formation of a roof 88 using a plurality of devices 90 in combination with a multiplicity of studs and cross members 92. Reinforcing rods 94 may also be employed to reinforce roof 88.

While in the foregoing, embodiments of the application have been set forth in considerable detail for the purposes of making a complete disclosure of the invention, it may be apparent to those of skill in the art that numerous changes may be made in such details without departing from the spirit and principles of the invention.

What is claimed is:

1. A method of constructing a building material device utilizing a vehicle tire having a body with a circular perimeter about an axis and a hole within the circular perimeter, comprising:
   splitting the vehicle tire in a direction intersecting the axis to form a first portion having a circular perimeter and a first chamber within the circular perimeter, a second portion, and a third portion having a circular perimeter and a second chamber within the circular perimeter;
   fastening said first and third portions to one another to allow communication between said first and second chambers and forming a subunit having a first side and an opposite second side;
   positioning said second portion within said first and second chambers;
   applying a first plate at said first side of said subunit;
   applying a second plate at said second side of said subunit, said first and second plates enclosing said second portion within said first and second chambers; and
   applying cementitious material to said first and second sides of said subunit, in abutment with said first and second plates, to form said building material device.

2. The method of claim 1 in which said first and second plates comprise first and second screens, respectively.

3. The method of claim 1 which further comprises the step of compressing said second portion following said step of positioning said second portion within said first and second chambers.

4. The method of claim 2 in which said first and second screens comprise metallic screens.

5. The method of claim 1 in which said first and second plates each comprise a solid body and a screen in overlying configuration.

6. The method of claim 5 which further comprises the step of compressing said second portion following said step of positioning said second portion within said first and second chambers.

7. The method of claim 6 in which said screens comprise metallic screens.

\* \* \* \* \*